(No Model.)
W. H. GELBAUGH.
NUT LOCK.
No. 526,896.    Patented Oct. 2, 1894.
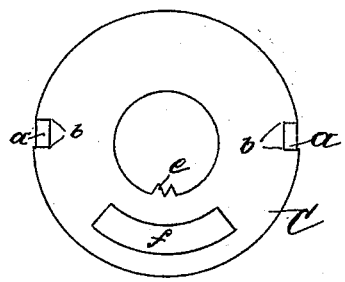
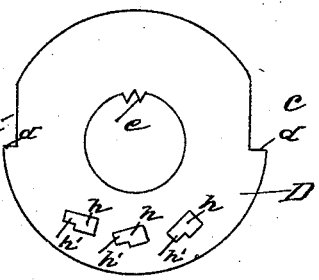
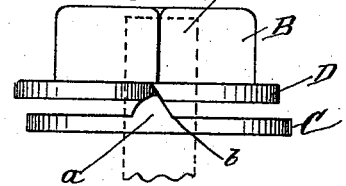
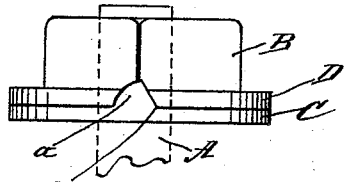
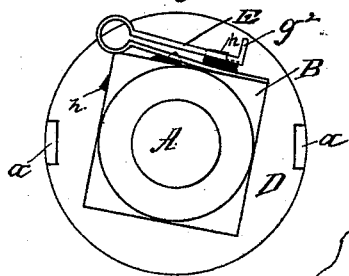
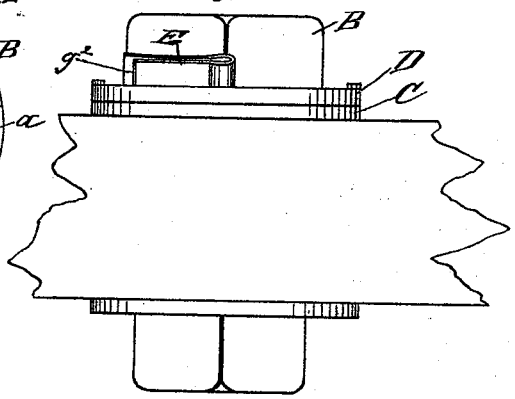
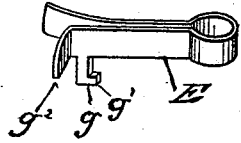
WITNESSES
INVENTOR
William H. Gelbaugh
By Fred W. Bond
Attorney

UNITED STATES PATENT OFFICE.

WILLIAM H. GELBAUGH, OF MANITOU, COLORADO, ASSIGNOR OF ONE-HALF TO ARTHUR HUTCHINSON, OF SAME PLACE.

NUT-LOCK.

SPECIFICATION forming part of Letters Patent No. 526,896, dated October 2, 1894.

Application filed March 7, 1894. Serial No. 502,621. (No model.)

*To all whom it may concern:*

Be it known that I, WILLIAM H. GELBAUGH, a citizen of the United States, residing at Manitou, in the county of El Paso and State of Colorado, have invented certain new and useful Improvements in Nut-Locks; and I do hereby declare that the following is a full, clear, and exact description of the same, reference being had to the annexed drawings, making a part of this specification, and to the letters of reference marked thereon, in which—

Figure 1, is a top view of the bottom or lower locking plate. Fig. 2, is a top view of the upper locking plate. Fig. 3, is a side view, showing a portion of the bolt, and illustrating the position of the locking plates, before the nut is seated to lock the plates to the bolt. Fig. 4, is a side view, showing the plates locked to the bolt, and the nut properly seated. Fig. 5, is a top view of the nut and locking plates, showing the nut locking spring placed in proper position. Fig. 6, shows all of the different parts placed in proper position to lock the nut and bolt. Fig. 7 is a detached view of the nut locking spring.

The present invention has relation to nut locks, and it consists in the different parts and combination of parts hereinafter described, and particularly pointed out in the claims.

Similar letters of reference indicate corresponding parts in all of the figures of the drawings.

In the accompanying drawings A, represents the bolt, which may be constructed of any desired length, and is provided with the ordinary screw-threads and head.

The nut B, is formed in the ordinary manner, and is attached to the bolt substantially as illustrated in the drawings.

The under or bottom washer or plate C, is substantially of the form shown in Fig. 1, and as shown it is provided with the flanges $a$, which flanges extend up a short distance and are provided with the inclined edges $b$, which inclined edges are for the purpose hereinafter described.

The top washer or plate D, is substantially of the form shown in Fig. 2, and as shown, it is provided upon its opposite edges with the notches, or cut-outs $c$, and the shoulders $d$.

The washers or plates C and D, are each provided with the teeth $e$, which teeth are located substantially as shown in Figs. 1 and 2.

The washer or plate C, is provided with the curved slot, or opening $f$, which slot or opening is for the purpose hereinafter described. In use after the bolt A has been placed through the objects or parts designed to be clamped the washer or plates C and D, are placed on the bolt A, substantially as illustrated in Fig. 3, after which the nut B is turned onto the bolt A, in the ordinary manner.

It will be understood that by placing the washers or plates C and D, in the position illustrated in Fig. 3, the inclined edges $b$, will come in contact with the shoulders $d$, and as the upper plate D is forced toward the lower plate, both plates will be forced against the screw-threaded portion of the bolt A, by means of the inclined edges $b$ and the shoulders $d$, which movement brings the plates C and D in to the position illustrated in Fig. 4, thereby securely seating the teeth $e$ against the screw-threaded portion of the bolt A, thereby locking the plates C and D, to the bolt A. After the nut B, has been properly seated, and the plates C and D locked to the bolt A, the nut locking spring is attached. The nut locking spring E, is substantially of the form shown in Fig. 7, and is preferably formed of spring steel, but other material may be used if desired.

The spring E, is provided with the tang $g$, which tang is formed integral with the spring, and as shown, said tang is provided with the right angle portion $g'$, which right angle portion is for the purpose of securing the spring to the top plate D as hereinafter described.

To apply the top spring, it is to be pressed firmly against the nut B, and the tang $g$, inserted in the hole of opening $h$, after which the spring is pressed downward and moved longitudinally until the tang is seated in the recess or notch $h'$, thereby securely attaching the spring E, to the plate D, and locking the nut B.

The curved slot or opening $f$, is for the purpose of providing an opening below the openings $h$, for the purpose of allowing the tang $g$ and its right angle portion $g'$ to come below the plate D. For the purpose of preventing the spring E, from tilting, after it has been properly attached the lateral arm $g^2$, is provided, the bottom or under side of which arm comes in contact with the top of the plate D.

Having fully described my invention, what I claim as new, and desire to secure by Letters Patent, is—

1. The combination of the screw-threaded bolt A, the nut B, the plate or washer C, provided with the flanges $a$ having the inclined edges $b$, the washer D, provided with the cut-out $c$, and the shoulders $d$, the teeth $e$, formed upon the washers or plates C and D, the openings and recesses $h$ and $h'$ formed upon or in the plate D, and the spring E, provided with the tang $g$, and the lateral arm $g^2$, substantially as and for the purpose specified.

2. The combination of a bolt, provided with a nut, the washer or plate C, provided with the opening $f$, and the flanges $a$, the washer or plate D, provided with the cut-outs $c$, and the shoulders $d$, the openings $h$, and recesses $h'$, and the spring E, substantially as and for the purpose specified.

In testimony that I claim the above I have hereunto subscribed my name in the presence of two witnesses.

WILLIAM H. GELBAUGH.

Witnesses:
W. E. SMILEY,
H. R. PENFIELD.